United States Patent
Chino et al.

(12) 
(10) Patent No.: US 6,502,839 B1
(45) Date of Patent: *Jan. 7, 2003

(54) SENSOR INSTALLATION STRUCTURE FOR VEHICLES

(75) Inventors: Kenji Chino, Kariya (JP); Yoshihisa Iwanaga, Kariya (JP)

(73) Assignee: Kabushiki Kaisha Toyoda Jidoshokki Seisakusho, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,511

(22) Filed: Jul. 1, 1998

(30) Foreign Application Priority Data

Jul. 2, 1997 (JP) .............................. 9-177145

(51) Int. Cl.⁷ ................................. B62D 7/18
(52) U.S. Cl. ................................. 280/93.512; 33/1 PT
(58) Field of Search ........................... 73/431; 220/364, 220/664; 174/110 E, 52.2, 52.3; 33/1 N, 1 PT, 203.18; 280/93.512

(56) References Cited

U.S. PATENT DOCUMENTS

| | | | | |
|---|---|---|---|---|
| 3,599,141 A | * | 8/1971 | Hildreth ...................... | 338/180 |
| 4,498,554 A | * | 2/1985 | Young et al. ................ | 180/236 |
| 4,692,086 A | * | 9/1987 | Morita et al. ................ | 414/635 |
| 5,052,119 A | * | 10/1991 | Eventoff ..................... | 33/569 |
| 5,155,660 A | * | 10/1992 | Yamada et al. ............. | 361/386 |
| 5,293,002 A | | 3/1994 | Grenet et al. .............. | 174/52.2 |
| 5,359,884 A | * | 11/1994 | Fey et al. .................... | 73/118.1 |
| 5,376,860 A | * | 12/1994 | Sato ............................ | 310/346 |
| 5,412,159 A | * | 5/1995 | Wiltgen et al. ............. | 174/250 |
| 5,557,142 A | * | 9/1996 | Gilmore et al. ............. | 257/659 |
| 5,636,703 A | * | 6/1997 | Papke et al. ................ | 180/400 |
| 5,657,544 A | * | 8/1997 | Ota et al. .................... | 33/1 N |
| 5,686,162 A | * | 11/1997 | Polak et al. ................. | 428/76 |
| 5,734,103 A | * | 3/1998 | Walding et al. ............. | 73/201 |
| 5,734,125 A | * | 3/1998 | Yasukuni et al. .......... | 174/52.2 |
| 5,750,925 A | * | 5/1998 | Purdom ...................... | 174/52.1 |
| 6,025,562 A | * | 2/2000 | Shimizu ..................... | 174/175 F |
| 6,030,684 A | * | 2/2000 | Polak et al. ................. | 428/76 |
| 6,051,783 A | * | 4/2000 | Dreyer et al. .............. | 174/52.2 |
| 6,293,022 B1 | * | 9/2001 | Chino et al. ............. | 33/203.18 |

FOREIGN PATENT DOCUMENTS

| | | |
|---|---|---|
| CA | 1133107 | 10/1982 |
| CA | 2208121 | 12/1998 |
| EP | 0 423 080 | 4/1791 |
| EP | 0 282 967 | 9/1988 |
| JP | 61-261164 | 11/1986 |
| JP | 2-27977 | 2/1990 |
| JP | 6-61653 | 8/1994 |
| JP | 6-62325 | 9/1994 |
| JP | 8-153816 | 6/1996 |

OTHER PUBLICATIONS

US 6,079,110, 6/2000, Chino et al. (withdrawn)*
EP 98 11 2175 Search Report dated Nov. 28, 2000.

* cited by examiner

Primary Examiner—Michael Cuff
(74) Attorney, Agent, or Firm—Woodcock Washburn LLP

(57) ABSTRACT

A sensor installation structure and method for a potentiometer located on the exterior of a fork lift. A sensor cover is fixed to a bracket to protect the potentiometer. The cover has an opening permitting the passage of lead wires. A fluid sealant is charged between the cover and the potentiometer to seal the potentiometer.

3 Claims, 4 Drawing Sheets

US 6,502,839 B1

SENSOR INSTALLATION STRUCTURE FOR VEHICLES

BACKGROUND OF THE INVENTION

The present invention relates to a sensor installation structure for industrial vehicles.

In industrial vehicles such as a fork lift, the swing amount of the rear axle is restrained by a controller to prevent the excessive inclination of the vehicles due to centrifugal force when turning. The control is executed based on the centrifugal acceleration and the yaw rate that act on the vehicles. The centrifugal acceleration is calculated from the steering angle (or wheel angle) of the wheels and the speed of the vehicles.

A method to calculate the wheel angle is described in Japanese Examined Patent Publication No. 4-24270. The forklift described in that publication has a power steering apparatus. The power steering apparatus includes a steering shaft rotated by a steering wheel and a valve unit connected to the shaft. The valve unit supplies hydraulic oil to and drains the oil from a cylinder in accordance with the rotation of the steering shaft. Piston rods protrude from both ends of the cylinder, and each piston rod is connected to a wheel. The cylinder is driven by hydraulic oil from the valve unit to steer the wheels. The piston rod motion is detected by a stroke sensor, and the wheel angle is calculated based on the detected value.

However, the linear movement of the piston rods have to be converted to the wheel angle, and the piston rod movement is not proportional to the wheel angle. This is because the piston rod linear movement is converted to the wheel rotation movement via a transmission mechanism such as a link. Accordingly, determining the wheel angle with respect to the piston rod movement is not easy.

To solve this problem, the wheel angle may be directly detected using a potentiometer. The potentiometer detects the rotation angle of a kingpin rotated with the wheels. The kingpin is pivotally supported by an upper bracket that constitutes an axle beam. The potentiometer is provided on the upper bracket, that is, over the kingpin, to detect the kingpin rotation angle.

According to this construction, since the upper bracket is located in a wheel well, the potentiometer is also located in the wheel well. Accordingly, the potentiometer is exposed to foreign substances such as pebbles and water spattered by the wheels. To protect the potentiometer from such foreign matter, the potentiometer is covered by a case made of hard material such as metal. The case has an opening for passage of the lead wires connected to the potentiometer.

However, since the interior of the wheel well is exposed to fine dust and rain water in addition to pebbles, these fine substances reach the potentiometer through the opening. This lowers the durability and accuracy of the potentiometer.

SUMMARY OF THE INVENTION

Accordingly, the objective of the present invention is to provide a sensor installation structure to ensure the protection of the sensor.

To achieve the above objective, the present invention provides a housing structure for protecting a vehicle sensor, wherein the sensor is provided on a structural member that is exposed to the environment, and wherein lead wires are connected to the sensor. The housing structure includes a cover fixed on the member to cover the sensor, wherein, the cover has an opening for permitting the passage of the lead wires, and a sealing material located between the cover and the sensor to seal the sensor.

The present invention further provides a cover for covering a sensor installed on a vehicle structural member, wherein the structural member is exposed to the environment, and wherein the cover has an opening for permitting the passage of lead wires of the sensor and a through hole, which is formed in a wall of the cover, for facilitating a sealing process for sealing the sensor.

The present invention also provides a method for installing a sensor in a vehicle, wherein lead wires are attached to the sensor. The method includes fixing the sensor on a structural member of the vehicle, covering the sensor with a cover, wherein the cover is exposed to the environment, and wherein the lead wires pass through an opening in the cover, charging a fluid sealing material inside the cover through the cover opening, and hardening the charged sealing material.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
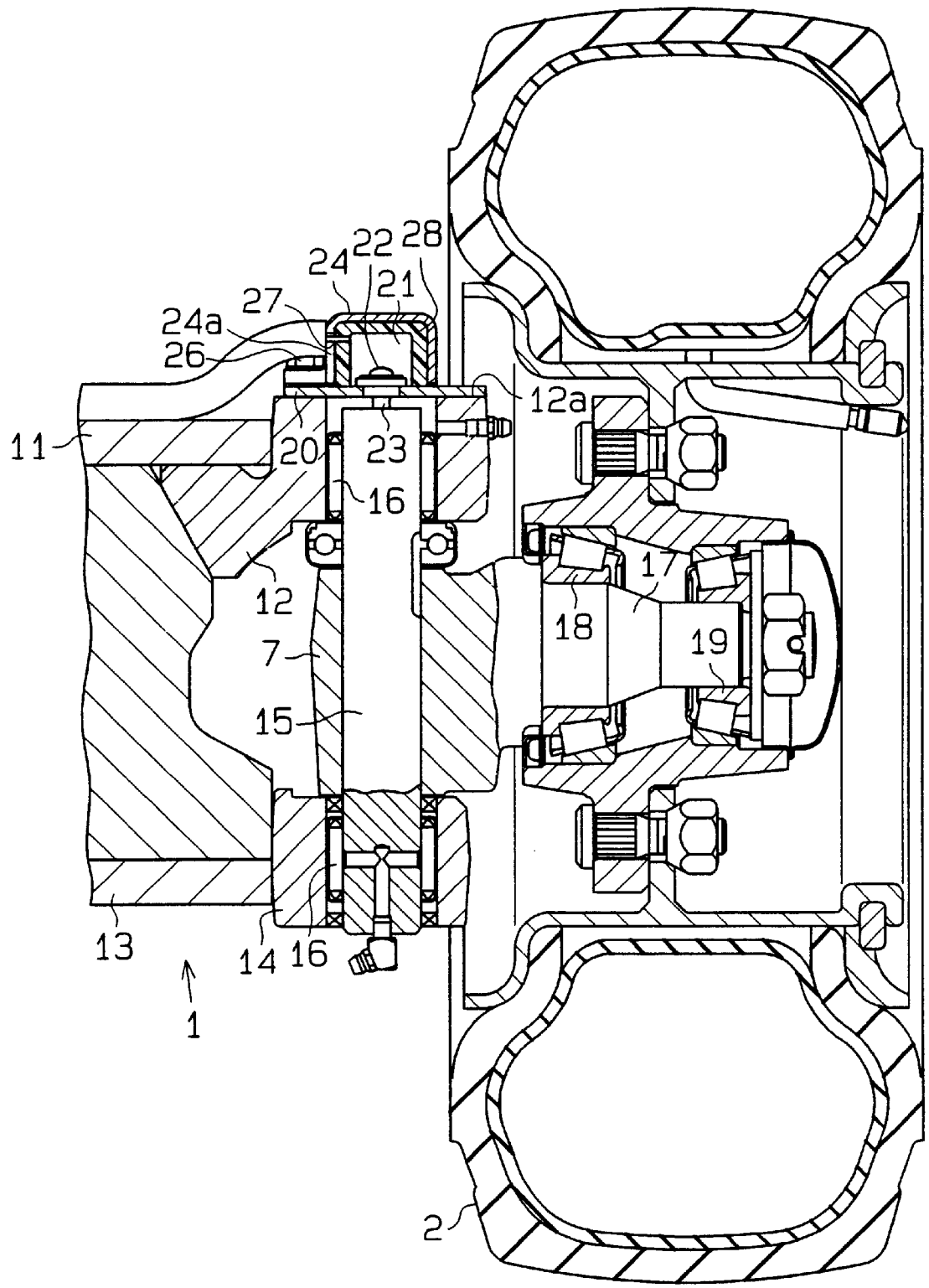
FIG. 1 is a sectional view of a sensor installation structure of an embodiment according to the present invention.

A potentiometer installation structure for detecting forklift wheel angle will now be explained with reference to FIGS. 1 to 4. As shown in FIG. 2, a drive train of rear wheels 2 includes a rear axle beam 1 for supporting the rear wheels 2, steering rods 5, 6 for steering the rear wheels 2, a cylinder 31 for moving a rod 32 axially by manipulating a steering wheel (not shown), and a bell crank 3 for converting the linear movement of the rod 32 to rotation movement of the rear wheels.

The bell crank 3 is pivotally supported on the rear axle beam 1 with a bell crank pin 4. The bell crank 3 is connected to steering knuckles 7, 8 by way of steering rods 5, 6. The knuckles 7, 8 support the rear wheels 2 on both sides of the rear axle beam 1. A first end of the steering rod 5 is pivotally connected to the bell crank 3 with a pin 9a, and a second end is connected to the steering knuckle 7 with a pin 10a. A first end of the steering rod 6 is pivotally connected to the bell crank 3 with a pin 9b, and a second end is connected to the steering knuckle 8 with a pin 10b. The rod 32 is connected to the bell crank 33 through a joint 33.

Figure 2:
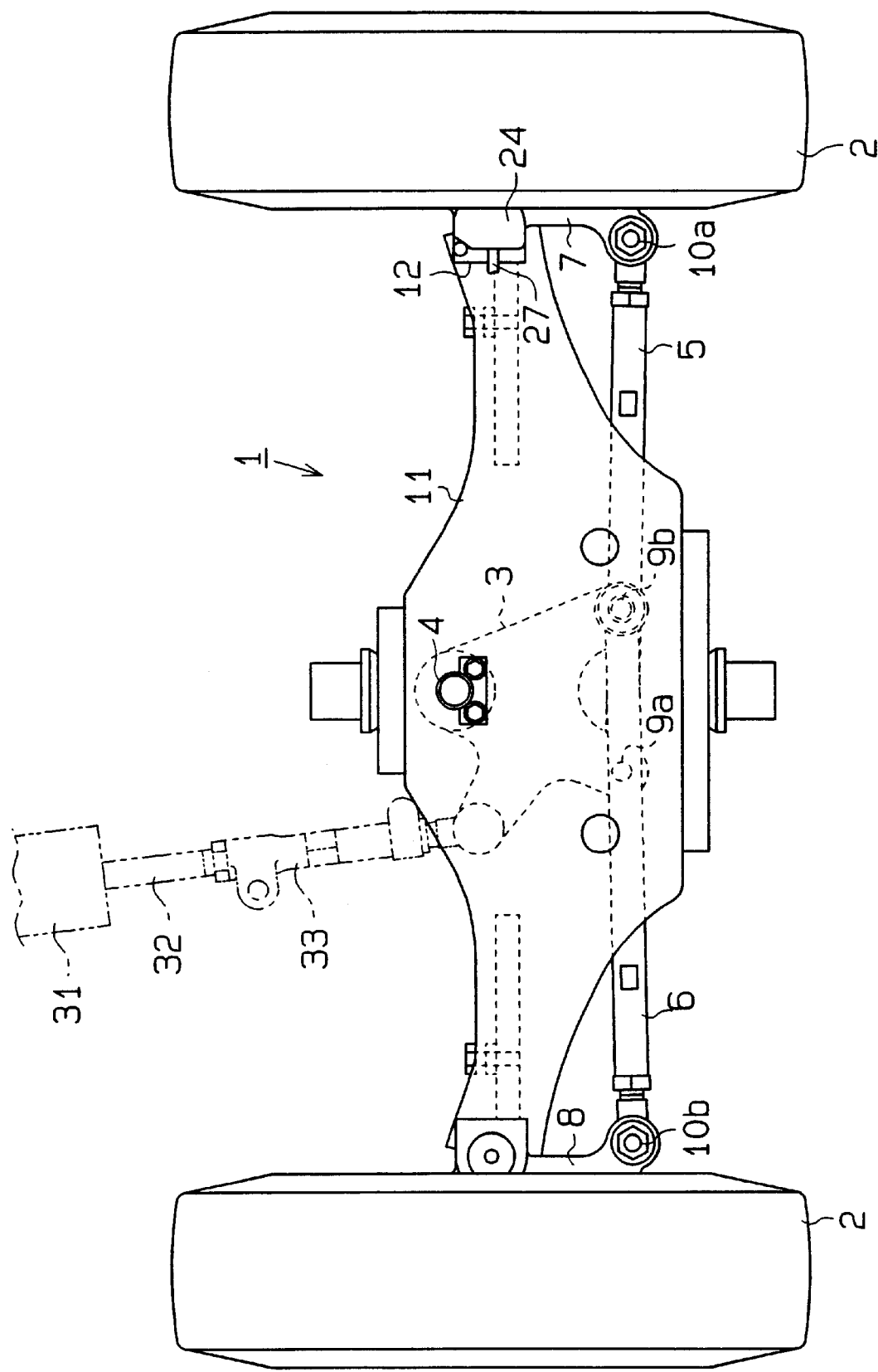
FIG. 2 is a plan view showing a rear axle of the embodiment.

FIG. 1 shows a sectional view of a rear axle beam 1. The rear axle beam 1 includes an upper member 11 and a lower member 13. An upper bracket 12 is rigidly attached to the upper member 11, and a lower bracket 14 to the lower member 13. The upper bracket 12 and the lower bracket 14 support pivotally a kingpin 15 by way of a pair of needle bearings 16. The steering knuckle 7 is fixed on the kingpin 15 to rotate integrally. The steering knuckle 7 has an axle 17. The rear wheels 2 are rotatably supported by the axle 17 through a pair of tapered roller bearings 18, 19.

Figure 3:
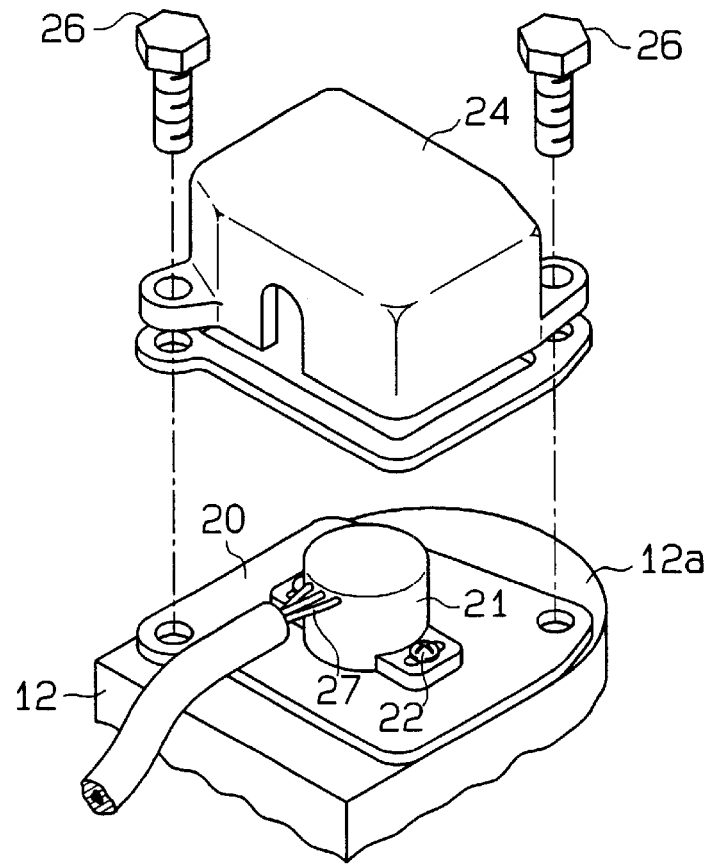
FIG. 3 is an exploded perspective view of the sensor installation structure according to the present invention.

As shown in FIGS. 1 and 3, a sensor, that is, a potentiometer 21, is provided on the upper side 12a of the upper bracket 12 by way of a plate 20. The potentiometer 21 is fixed to the plate 20 by a screw 22. The wheel 2 and the upper bracket 12 are covered with a wheel cover (not shown).

Figure 4:
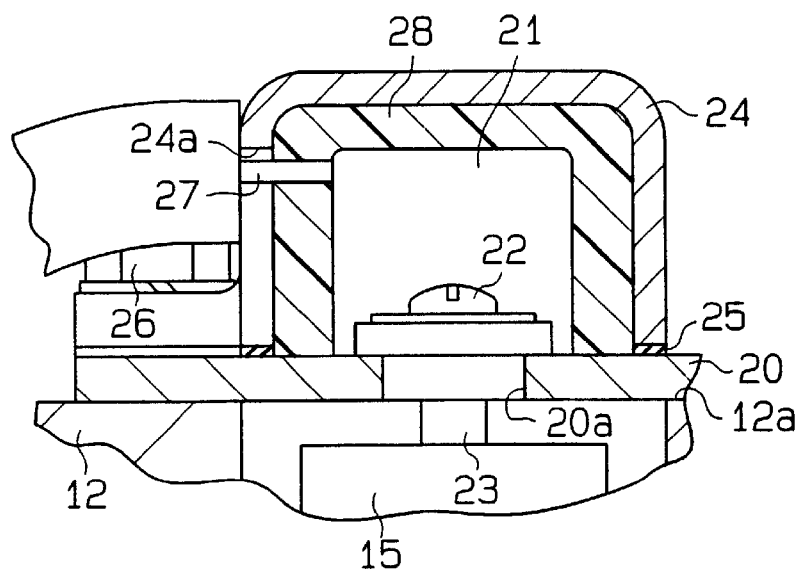
FIG. 4 is a partial enlarged sectional view of the sensor.

As shown in FIG. 4, the plate 20 has a through hole 20a. An input shaft 23 is connected to the kingpin 15 through the hole 20a. The potentiometer 21 detects the rotation angle of the kingpin 15, that is, the wheel 2, through the input shaft 23. When the bell crank 3 is steered based on the rotation of the steering wheel, the steering knuckles 7, 8 are steered through the steering rods 5, 6. Accordingly, the rear wheel 2 is steered by a wheel angle based on the steering wheel rotation amount. The kingpin 15 rotates according to the wheel angle and the input shaft 23 rotates the same amount as that of the kingpin 15. Thus, the potentiometer 21 detects the rotation amount of the kingpin 15, which corresponds to the wheel angle.

A sensor cover 24 is attached on the plate 20 by way of a gasket 25 to cover the potentiometer 21. The sensor cover 24 is fixed on the upper bracket 12, together with the plate 20 by screws 26. The sensor cover 24 is formed of, for example, metal, in a shape to shelter the potentiometer 21. Materials other than metal such as synthetic resin and ceramics may also be used to form the sensor cover 24. The sensor cover 24 has an opening 24a for permitting passage of the lead wires 27 connected to the potentiometer 21.

A sealing material 28 is charged between the sensor cover 24 and the potentiometer 21, to seal the potentiometer 21 from the environment. In this embodiment, epoxy resin, which is a thermosetting resin, is employed as the sealing material 28.

When the potentiometer 21, the gasket 25, and the sensor cover 24 are fixed on the upper bracket 12, the sealing material 28, which is in a fluid state, is injected inside the sensor cover 24 through the opening 24a. To prevent leakage of the charged sealing material 28, the opening 24a should be temporarily covered with a lid (not shown), which may be either left in place or taken off after the resin hardens. The sealing material 28 is then heated from outside the sensor cover 24 and is hardened. To prevent harm to the potentiometer 21, temperatures higher than 100° C. are avoided during heating. The condition for hardening resins differ according to the kind of resin, and there is one type that hardens at normal temperatures.

As described above, the potentiometer 21 is doubly sealed by the sensor cover 24 and the sealing material 28. As a result, the potentiometer 21 is protected from pebbles, dust, and rain water, thus avoiding degradation of its detection accuracy and durability.

Also, in this embodiment, the potentiometer 21 is sealed after the assembly of the potentiometer 21 with lead wires connected and the sensor cover 24 in place.

It should be apparent to those skilled in the art that the present invention may be embodied in many other specific forms without departing from the spirit or scope of the invention. Particularly, it should be understood that the invention may be embodied in the following forms.

Figure 5:
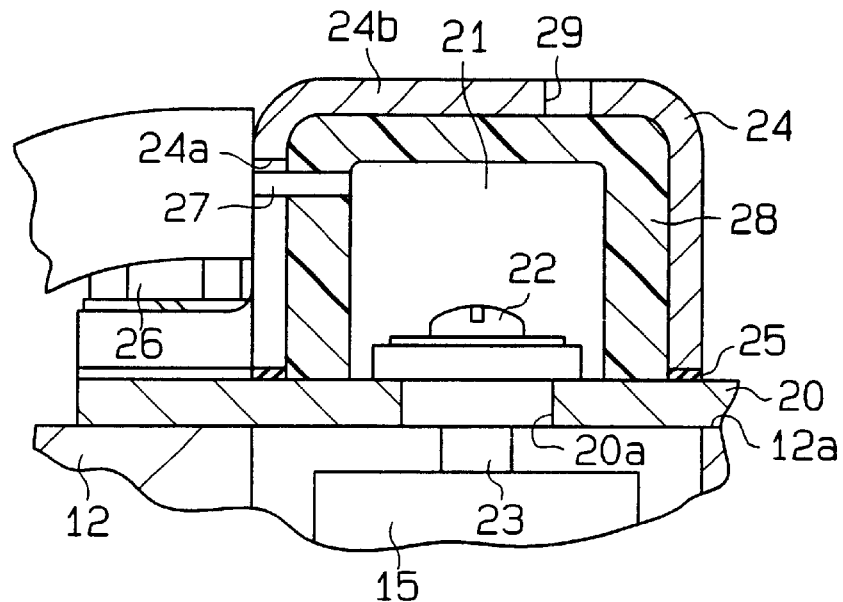
FIG. 5 is a sectional view showing a sensor installation structure of a further embodiment according to the present invention.

(1) As shown in FIG. 5, the sensor cover 24 may have a through hole 29 for injecting the sealing material 28, in addition to the opening 24a. The fluid sealing material 28 is charged between the potentiometer 21 and the sensor cover 24 through the hole 29. To prevent leakage of the sealing material 28, the opening 24a should be covered with a lid. When the opening 24a is covered, a small clearance is formed between the opening 24a and the lid. The clearance is small enough to prevent leakage but large enough to permit the passage of air. The lid may be either left attached or taken off after the resin hardens.

According to this construction, air in the sensor cover 24 is discharged through the opening 24a and the sealing material 28 is easily injected. This ensures the proper sealing of the potentiometer 21. As shown in FIG. 5, the through hole 29 is formed on the upper side 24b of the sensor cover 24 and this makes the sealing of potentiometer easy and certain. The sealing material 28 may also be injected through the opening 24a, which causes air in the sensor cover 24 to be discharged through the hole 29.

(2) The sealing material 28 may be employed before assembling the sensor cover 24 and the plate 20 on the upper bracket 12. That is, after the potentiometer 21 is assembled on the plate 20, the potentiometer 21 is sealed by applying the sealing material 28 to the surface of the potentiometer 21. To prevent the sealing material 28 from spreading too much, sealing material 28 with a relatively high viscosity should be used. Then, the sensor cover 24 together with the plate 20 are assembled on the upper bracket 12. The potentiometer 21 is sealed with certainty in this way also.

Instead of applying the sealing material 28 on the potentiometer 21, sealing material 28 with a relatively high viscosity may also be applied to or poured into the inside of the sensor cover 24.

Figure 6:
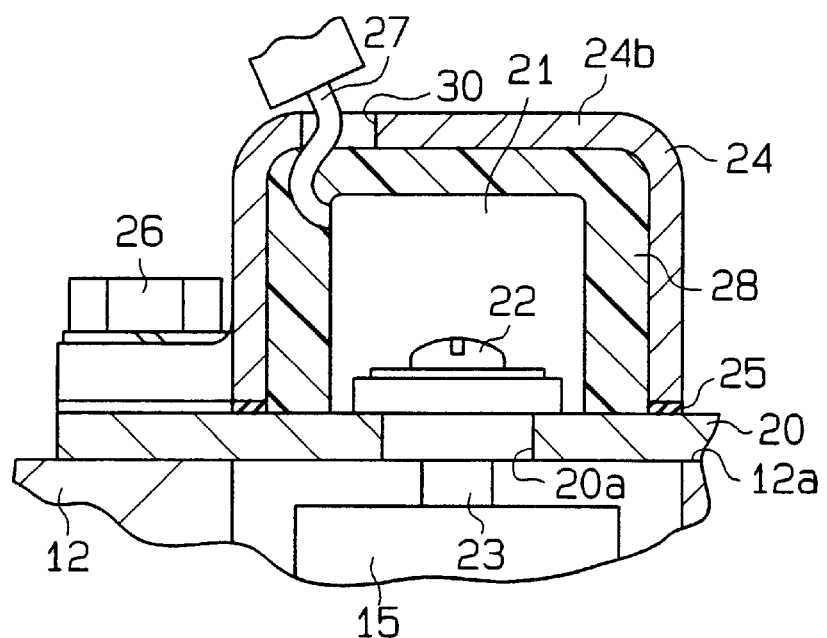
FIG. 6 is a sectional view showing a sensor installation structure of a further embodiment according to the present invention.

(3) As shown in FIG. 6, instead of the opening 24a, a through hole 30 for accommodating the lead wires, may also be formed on the upper side 24b of the sensor cover 24. The sealing material 28 is injected into the sensor cover 24 through the hole 30. In this case, the hole 30 is located on the upper side 24b of the cover 24b, which prevents leakage of the sealing material 28 from the cover 24. Accordingly, the sealing material 28 is charged inside the cover 24 without a lid on the hole 30. This makes the sealing of the potentiometer 21 easy and certain.

(4) As long as the wheel angle of the wheel 2 is detected, the displacement of a rotating portion other than the kingpin 15 may also be detected by the potentiometer 21. For example, in a folk lift that has a bell-crank pin 4 formed to rotate integrally with the bell crank 3, the rotation amount of the bell-crank pin 4 may be detected by a potentiometer. In this case, the potentiometer is located on the upper member 11.

Also, the rotation amount of the pins 9a, 9b relative to the steering rods 5, 6 may be detected by a potentiometer located on the steering rods 5, 6. Also, the rotation amount of the pins 10a, 10b relative to the steering rods 5, 6 may be detected by a potentiometer located on the steering rods 5, 6.

Furthermore, the present invention may be embodied in a sensor installation structure of other sensors such as a velocity sensor and an acceleration sensor for vehicles.

(5) A thermosetting resin other than epoxy resin, a thermoplastic resin such as a polyethylene, or an elastomer such as a silicone rubber may be employed as a sealing material 28. These materials are all waterproof and insulating. There are other materials that may be used as a sealing material 28 with the same properties, such as silicone gel type material and foamed material such as a cellular plastic.

The sealing material 28 may be a combination of more than one kind of synthetic resin, a combination of more than one kind of elastomer, or a combination of a synthetic resin and an elastomer. For example, the sealing material may be double-structured, with soft fluid like a silicone gel inside and with hard material outside. This effectively buffers shocks applied to the sensor cover 24.

(6) The present invention may be applied to vehicles such as trucks, buses, cars, or motor bikes in addition to industrial vehicles like a forklifts.

Therefore, the present examples and embodiments are to be considered as illustrative and not restrictive and the invention is not to be limited to the details given herein, but may be modified within the scope and equivalence of the appended claims.

What is claimed is:

1. A sensor and housing structure for use on a vehicle having a kingpin rotatable with a steerable wheel of the vehicle, a bracket exposed to the environment and supporting the kingpin, and a potentiometer having a rotary shaft coupled to the kingpin and being adapted to transmit an electrical signal through a lead wire, the electrical signal relating to an angle of rotation of the kingpin, the sensor and housing structure comprising:

a plate adapted to be attached to the bracket and adapted for mounting the potentiometer thereon, wherein the plate has a first through hole formed therein for permitting the rotary shaft to extend through the plate and to be coupled to the kingpin;

a cover that covers the potentiometer and thereby protects the potentiometer from the environment, wherein the cover is fixed to the plate and the cover has a second through hole located in an upper surface of the cover, the second through hole permitting the lead wire to pass through the cover to the environment; and a sealing material provided within the cover to fill a space between the cover and the potentiometer, wherein the sealing material is solidified after being introduced into the space, and the area of the second through hole is larger than the cross-sectional area of the lead wire so that air is discharged from the space through the second through hole when the sealing material is conducted in liquid form into the space through the second through hole.

2. The sensor and housing structure according to claim 1, wherein the cover is fixed to the plate through a gasket.

3. The sensor and housing structure according to claim 1, wherein the sealing material includes epoxy resin.

* * * * *